United States Patent
Moosavi et al.

(10) Patent No.: US 8,869,248 B2
(45) Date of Patent: Oct. 21, 2014

(54) COMMUNICATION SYSTEM PROVIDING WIRELESS AUTHENTICATION FOR PRIVATE DATA ACCESS AND RELATED METHODS

(75) Inventors: Vahid Moosavi, Kitchener (CA); Jason Tyler Griffin, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 593 days.

(21) Appl. No.: 12/856,766

(22) Filed: Aug. 16, 2010

(65) Prior Publication Data

US 2012/0042363 A1 Feb. 16, 2012

(51) Int. Cl.
*G06F 15/16* (2006.01)
*G06F 7/04* (2006.01)
*G06F 17/30* (2006.01)
*H04L 29/06* (2006.01)
*H04L 9/32* (2006.01)
*H04W 4/00* (2009.01)
*H04W 12/06* (2009.01)

(52) U.S. Cl.
CPC ............. *H04W 4/008* (2013.01); *H04L 9/3228* (2013.01); *H04L 63/18* (2013.01); *H04L 2209/805* (2013.01); *H04W 12/06* (2013.01)
USPC .............................................. 726/5; 380/270

(58) Field of Classification Search
None
See application file for complete search history.

(56) References Cited

U.S. PATENT DOCUMENTS

| | | | |
|---|---|---|---|
| 6,515,575 B1 * | 2/2003 | Kataoka .......................... 340/5.8 |
| 7,024,394 B1 | 4/2006 | Ashour et al. |
| 7,039,392 B2 * | 5/2006 | McCorkle et al. ............ 455/411 |
| 7,289,790 B2 * | 10/2007 | McCorkle et al. ............ 455/411 |
| 7,739,503 B2 * | 6/2010 | Sato et al. ...................... 713/169 |
| 7,873,836 B2 * | 1/2011 | Rekimoto ...................... 713/189 |
| 7,965,845 B2 * | 6/2011 | Baldus et al. ................. 380/279 |
| 8,295,483 B2 * | 10/2012 | Kageyama .................... 380/247 |
| 8,423,785 B2 * | 4/2013 | Takikawa et al. ............. 713/186 |
| 8,566,592 B2 * | 10/2013 | Sato et al. ...................... 713/169 |

(Continued)

FOREIGN PATENT DOCUMENTS

| CN | 1596027 | 3/2005 |
|---|---|---|
| EP | 1361723 | 11/2003 |

(Continued)

OTHER PUBLICATIONS

Al-Qayedi, A. et al, Combined Web/Mobile Authentication for Secure Web Access Control, Mar. 2004, IEEE WCNC.*

(Continued)

*Primary Examiner* — Brian P Whipple
(74) *Attorney, Agent, or Firm* — Allen, Dyer, Doppelt, Milbrath & Gilchrist, P.A.

(57) ABSTRACT

A communication system may include a server configured to provide data access based upon an authenticated logon, and a computer configured to access the server to receive a temporary authenticated logon identification (ID) for the server. The communication system may further include a mobile wireless communications device including a housing, a wireless transceiver carried by the housing, a sensor carried by the housing, and a controller carried by the housing, the controller being coupled to the wireless transceiver and the sensor. The controller may be configured to cause the sensor to wirelessly retrieve the temporary authenticated logon ID from the computer, and cause the wireless transceiver to wirelessly communicate logon data to the server for providing data access via the computer based upon the temporary authenticated logon ID.

21 Claims, 4 Drawing Sheets

(56) References Cited

U.S. PATENT DOCUMENTS

| | | | |
|---|---|---|---|
| 2004/0203600 A1* | 10/2004 | McCorkle et al. | 455/411 |
| 2004/0205189 A1* | 10/2004 | Sata et al. | 709/225 |
| 2005/0059398 A1 | 3/2005 | Jaupitre et al. | |
| 2006/0002558 A1* | 1/2006 | Rekimoto | 380/270 |
| 2006/0179311 A1* | 8/2006 | McCorkle et al. | 713/168 |
| 2006/0183462 A1* | 8/2006 | Kolehmainen | 455/411 |
| 2007/0214357 A1* | 9/2007 | Baldus et al. | 713/157 |
| 2007/0288995 A1* | 12/2007 | Terada et al. | 726/2 |
| 2008/0155261 A1* | 6/2008 | Sato et al. | 713/169 |
| 2009/0064315 A1* | 3/2009 | Hong et al. | 726/17 |
| 2009/0117883 A1* | 5/2009 | Coffing et al. | 455/414.1 |
| 2009/0216587 A1* | 8/2009 | Dwivedi et al. | 705/7 |
| 2010/0122338 A1* | 5/2010 | Kataoka et al. | 726/12 |
| 2010/0199339 A1* | 8/2010 | Kageyama | 726/7 |
| 2010/0205438 A1* | 8/2010 | Sato et al. | 713/169 |
| 2011/0247058 A1* | 10/2011 | Kisters | 726/5 |

FOREIGN PATENT DOCUMENTS

| | | | |
|---|---|---|---|
| EP | 2166697 | 3/2010 | H04L 9/32 |
| JP | 200255955 | 2/2002 | |
| JP | 2009230432 | 10/2009 | |
| JP | 2009277024 | 11/2009 | |
| WO | 2009/101549 | 8/2009 | H04L 29/06 |
| WO | 2009/127984 | 10/2009 | H04W 29/06 |
| WO | WO 2009/127984 A1 * | 10/2009 | |

OTHER PUBLICATIONS

U.S. Appl. No. 13/315,758, filed Dec. 9, 2011.
"*The Real Solution-Aradiorn SolidPass*" www.aradiom/com/solidpass/2fa-OTP-security-token.htm.
"*What makes KYPS special?*" http://net/home/comparison.
Wu et al. "*Secure Web Authentication With Mobil Phones*" MIT Computer Science and Artificial Intelligence Lab.
Feng Zhu "*Smart Card Based Solutions for Secure Internet Banking with a primitive reader or mobile phone*" Jan. 31, 2009.
"The Real Solution-Aradiom SolidPass" www.aradiom/com/solidpass/2fa-OTP-security-token.htm; Printed Apr. 21, 2010; 3 pgs.
"What makes KYPS special?" http://net/home/comparison: Printed Apr. 21, 2010; 4 pgs.
Wu et al. "Secure Web Authentication With Mobil Phones" MIT Computer Science and Artificial Intelligence Lab: Printed Apr. 21, 2010; 23 pgs.

\* cited by examiner

COMMUNICATION SYSTEM PROVIDING WIRELESS AUTHENTICATION FOR PRIVATE DATA ACCESS AND RELATED METHODS

TECHNICAL FIELD

The present disclosure relates generally to the field of communications systems, and, more particularly, to authentication techniques for communication systems and related methods.

BACKGROUND

Mobile wireless communications systems continue to grow in popularity and have become an integral part of both personal and business communications. For example, cellular telephones allow users to place and receive voice calls from almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example. Even so, the use of computer terminals still remains prevalent, and users often utilize both computer terminals and wireless devices for accessing personal or private data over such networks.

DETAILED DESCRIPTION

Figure 1:
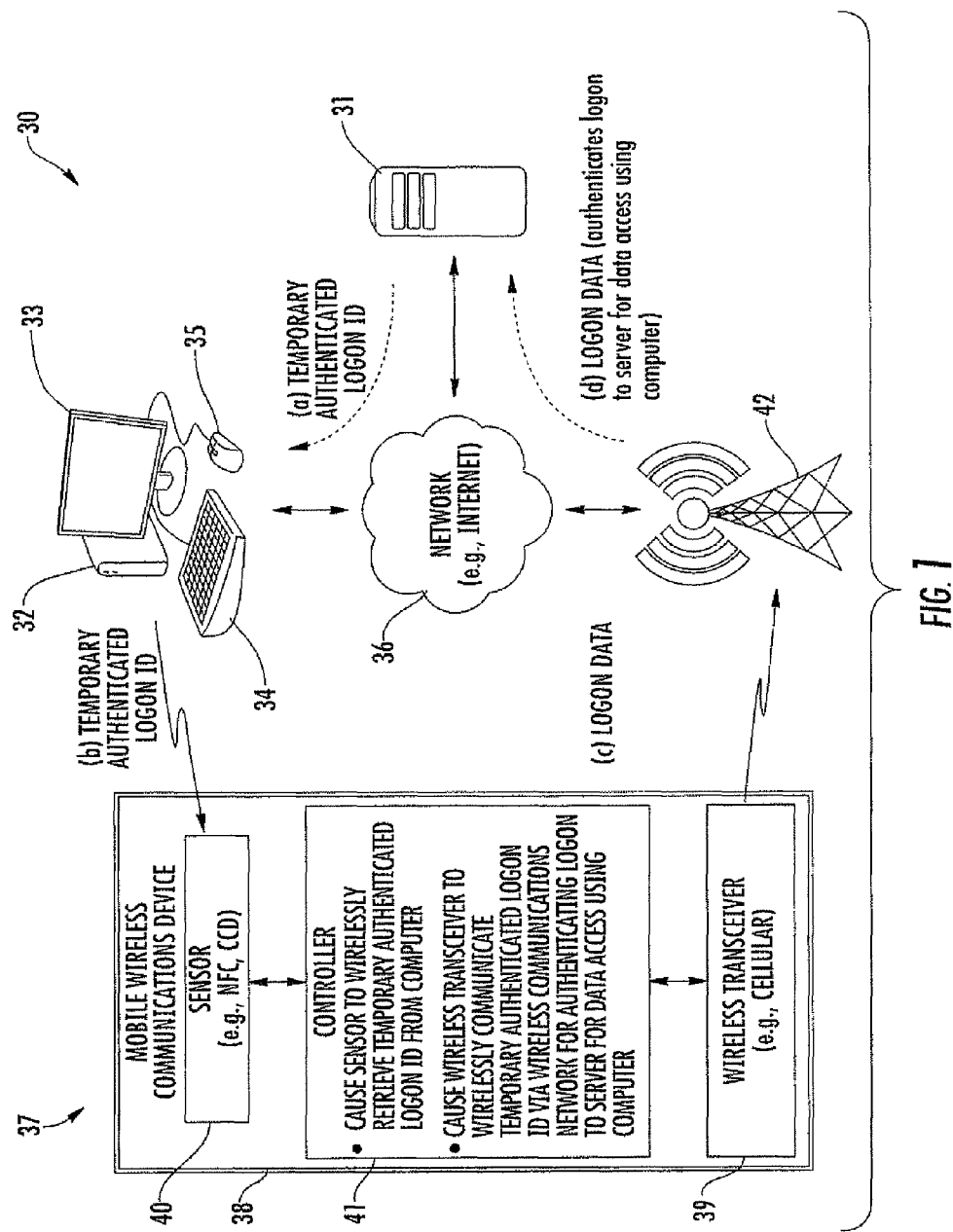
FIG. 1 is schematic block diagram of a communication system providing wireless logon authentication features in accordance with one aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communication system is provided herein which may include a server configured to provide access based upon an authenticated logon, and a computer configured to access the server and to receive a temporary authenticated logon identification (ID) for the server. The communication system may further include a mobile wireless communications device including a portable housing, a wireless transceiver carried by the portable housing, a sensor carried by the portable housing, and a controller carried by the portable housing and coupled to the wireless transceiver and the sensor. The controller may be configured to cause the sensor to wirelessly retrieve the temporary authenticated logon ID from the computer terminal, and cause the wireless transceiver to wirelessly communicate logon data via a wireless communications network for authenticating logon to the server for data access using the computer terminal based upon the temporary authenticated logon ID. As such, the mobile wireless communications device may advantageously be used to securely provide logon credentials for using a public or other computer terminal which may not necessarily be secure.

More particularly, the sensor may comprise a near field communication (NFC) sensor, and the computer and NFC sensor may be configured to communicate the temporary authenticated logon ID therebetween via NFC communications. In accordance with another example, the communication system may further include a display coupled to the computer, and the computer may be further configured to cause the display to display an optical pattern representing the temporary authenticated logon ID. Further, the sensor may comprise an optical sensor, and the controller may be further configured to cause the optical sensor to read the optical pattern from the display and determine the temporary authenticated logon ID therefrom.

By way of example, the temporary authentication logon ID may comprise a pseudorandom password. In addition, the temporary authentication logon ID may comprise an Internet Protocol (IP) address associated with at least one of the server and the computer.

A related mobile wireless communications device, such as the one described briefly above, a related computer-readable medium for a mobile wireless communications device, and a related communications method are also provided. The method may include accessing a server configured to provide data access based upon an authenticated logon from a computer over a wide area network to receive a temporary authenticated logon identification (ID) for the server. The method may further include wirelessly retrieving the temporary authenticated logon ID from the computer to a mobile wireless communications device, and wirelessly communicating the logon data from the mobile wireless communications device via a wireless communications network and authenticating logon to the server for data access using the computer based upon the temporary authenticated logon ID.

Figure 3:
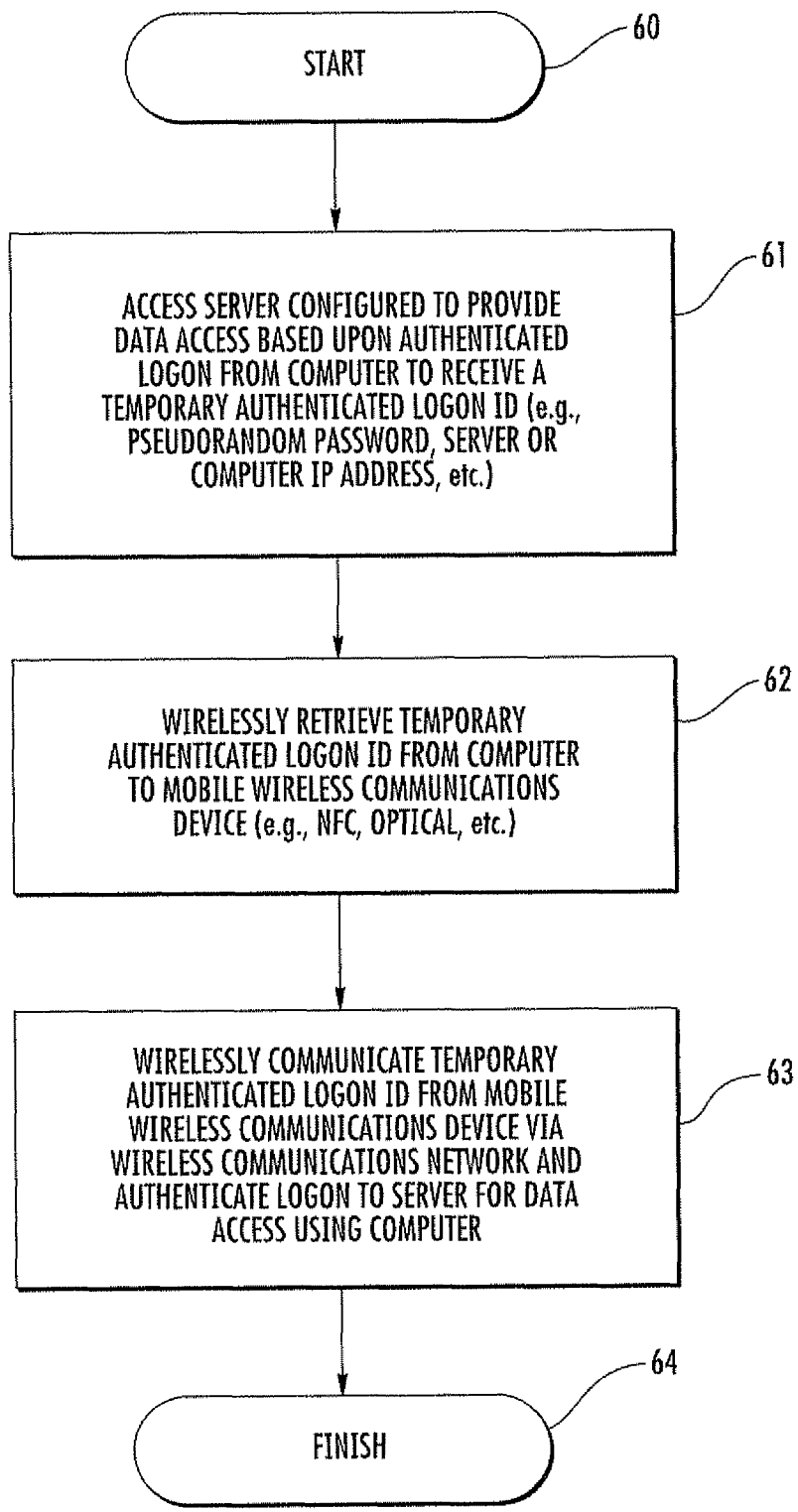
FIG. 3 is a flow diagram illustrating method aspects associated with the system of FIG. 1.

Referring initially to FIGS. 1 and 3, a communications system 30 illustratively includes a server 31 configured to provide data access (e.g., to private data) based upon an authenticated logon, and a computer or computer terminal 32 configured to access the server, at Blocks 60-61. In the illustrated example, a display 33, keyboard 34, and a mouse 35 are associated with the computer terminal 32, although other input or output devices may be used. By way of example, the computer terminal 32 may comprise a desktop computer, a laptop computer, a tablet PC, a PC, a Mac, a network workstation, etc. By way of example the computer terminal 32 may be locked in a public environment, such as a library, an airport, a bus station, a hotel, a guest office, etc.

The server 31 and computer terminal 32 may communicate via a network 36, such as the Internet, for example. In some applications, the computer terminal 32 may be a public computing terminal used by many users, or in a shared environment where the computer terminal 32 is not under a given user's control. As such, this may be a concern because of the existence of programs such as keyloggers, which can record keystrokes in the background and unbeknownst to a user. As such, a user may risk having sensitive information, such as account passwords, stolen by using such computer terminals. Concern for keyloggers or other similar programs may cause users to have to change their passwords after each time such a computer terminal is used. Furthermore, it can be difficult to remember each new password. This difficulty is further compounded when different passwords associated with multiple accounts are used. Furthermore, some users may be forced to avoid such computer terminals altogether, which may be impractical in some circumstances.

As such, the server 31 may advantageously provide a temporary authenticated logon identification (ID) when the computer terminal 32 logs on to request access to private data. For example, if a user logs on to a particular Internet site to check email messages (e.g., Gmail, Yahoo! Mail, etc.), the user is typically required to provide a user name and password to access private information associated with the particular Internet site. Other examples may include online banking, checking stocks or 401K online, online gaming, checking in to a flight, social networking sites such as Facebook, Twitter MySpace, shopping online, photosharing sites such a Flickr, Youtube, etc.

In accordance with the present example, a user may instead only be required to provide an indication of who he or she is (such as a user name) via the computer terminal 32 from which access is desired to receive the temporary authenticated logon ID, but not his or her password. Instead, a mobile wireless communications device 37 (also referred to as a "mobile device" herein) is used for authentication purposes to circumvent the possibility of a password or passcode being compromised by a keylogger program, for example.

More particularly, the mobile device 37 illustratively includes a portable housing 38, a wireless transceiver 39 carried by the portable housing 38, a sensor 40 carried by the portable housing 38, and a controller 41 carried by the portable housing 38, the controller 41 being coupled to the wireless transceiver 39 and the sensor 40. By way of example, the wireless transceiver 39 may communicate via a cellular, wireless local area network (WLAN), WiMAX, or other suitable format. Example types of mobile devices 37 which may be used include portable or personal media players (e.g., MP3 players, video players, etc.), portable gaming devices, portable or mobile telephones, smartphones, etc.

Generally speaking, the controller 41 may be configured to cause the sensor 40 to wirelessly retrieve the temporary authenticated logon ID from the computer terminal 32, at Block 62. Moreover, the controller 41 causes the wireless transceiver 39 to wirelessly communicate logon data via a wireless communications network (illustratively represented by a communications tower 42 in FIG. 1) for authenticating logon to the server 31 for private data access using the computer terminal 32 based upon the temporary authenticated logon ID, at Block 63, thus concluding the method illustrated in FIG. 3 (Block 64).

Stated alternatively, upon wirelessly receiving the temporary authentication logon ID from the computer terminal 32, the controller 41 is able to either forward the temporary authentication logon ID back to the server 31, or generate other authentication data based upon the temporary authentication logon ID (e.g., the logon ID could be used as a key or seed for an encryption algorithm, etc.). Because the mobile device 40 is associated with a particular user, as is the user name for the server 31 account, when the server provides the temporary authentication logon ID responsive to the user name the server 31 is aware that the mobile device 37 is authorized to provide a response, the server 31 is also aware of what the response is supposed to be. This is because the response is based upon the temporary authentication logon ID. In this way, the mobile device 37 may advantageously be used to securely provide logon credentials for using the computer terminal 32, and thus avoid the necessity for the user to input the user's password directly to the computer terminal and risk compromise of the password through key logging, etc.

In accordance with one example implementation, the sensor 40 may comprise a near field communication (NFC) sensor, and the computer terminal 32 may comprise another NFC sensor configured to communicate the temporary authenticated logon ID to the NFC sensor of the mobile device 37 via NFC communications. NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 2:
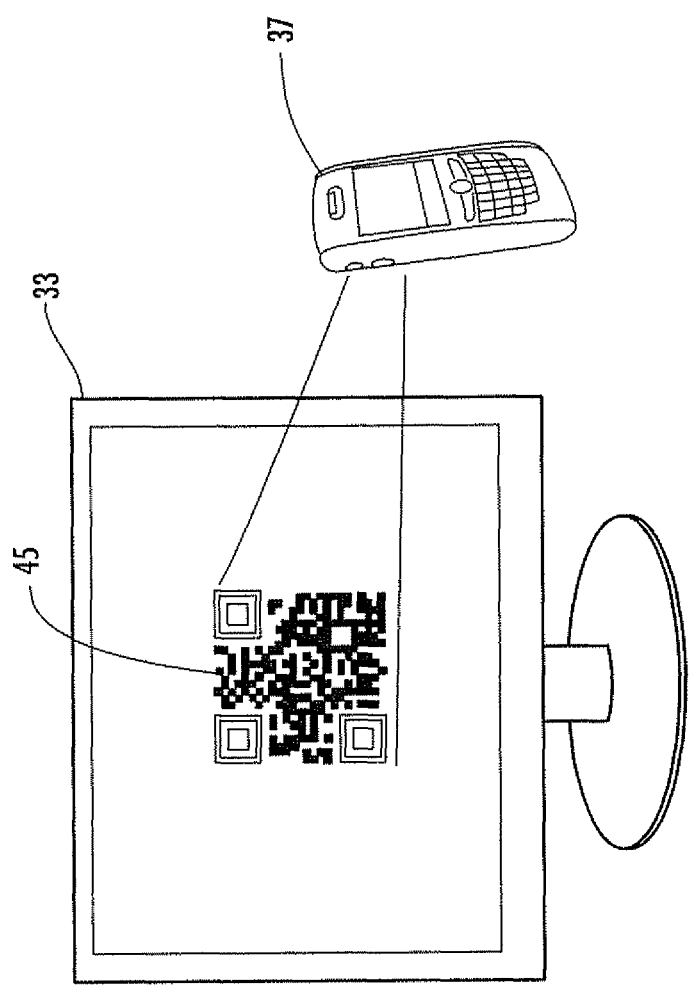
FIG. 2 is a perspective diagram of a computer terminal display and mobile wireless communications device of the system of FIG. 1 showing authentication data exchange via optical reading.

Turning now additionally to FIG. 2, in accordance with one example aspect, the computer terminal 32 may be further configured to cause the display 33 to display an optical pattern 45 representing the temporary authenticated logon ID. In the illustrated example, the optical pattern 45 comprises a quick response (QR) barcode, but other types of barcodes or optical machine-readable representations of data may be used in different embodiments to represent the temporary authentication logon ID. As such, the sensor 40 may comprise an optical sensor, such as a charge-coupled device (CCD) from a digital camera implemented on the mobile device 37. The controller 41 may accordingly be further configured to cause the optical sensor 38 to read the optical pattern 45 from the display 33 as shown, and determine the temporary authenticated logon ID from the optical pattern 45.

By way of example, the temporary authentication logon ID may comprise a pseudorandom password. In addition, the temporary authentication logon ID may comprise an Internet Protocol (IP) address associated with the server 31 or the computer terminal 32 (or both). Generally speaking, the authentication logon ID will be temporary so that it is not valid for multiple logon sessions, to therefore help prevent the possibility of unauthorized access to private data accounts.

In some embodiments, the server 31 may be configured as an intermediary authentication server for other servers which store the private data. For example, the server 31 may store logon credentials for one or more accounts (e.g., Gmail, Yahoo! Mail, etc.), and it handles the logon and interface operations for a given user to access his or her private data on these various other servers once the user properly establishes a session with the server 31 based upon the temporary authentication logon ID. This may advantageously provide a convenient central point for a user to access one or more private data account. This may also alleviate the user from the burden of having to continuously create and keep track of multiple different passwords. Also, this may avoid the need for generating multiple different temporary authenticated logon ID passwords for different accounts, although this may be done if desired in some embodiments.

The foregoing will be further understood with reference to an example implementation using a secure mobile device network (e.g. a cellular network) to securely and conveniently logon to online accounts through a computer terminal 32 that may be compromised with trojans, key loggers, etc. In the example embodiment, a user provides the computer terminal 32 with the web address for the server 31, the server 31 is enabled to provide the temporary authentication logon ID via a browser on the computer terminal 32, for example. Then, instead of providing the user's password, the user clicks on a link or button to access the wireless logon authentication process.

At this point, the server 31 creates the temporary authentication logon ID, which may take the form of a string that holds a one-time temporary password, an IP address of the computer terminal 32, a Web address of the server 31, etc. As discussed above, the temporary authentication ID may either be shown as an optical pattern on the display 41, or made available from the computer terminal 32 via NFC, etc. The user thus swipes his or her mobile device 37 for NFC communication (or holds the mobile device in front of the optical pattern 45 on the display so it is viewable by the digital camera CCD) to read the temporary authentication logon ID created by the server 31.

An application on the mobile device 37 executable by the controller 41 uses the temporary authentication logon ID to contact the server 31, along with an identifier of the mobile device (e.g., a mobile device PIN, email address, etc.) to authenticate logon for private data access using the computer terminal 32. The server 31 and computer terminal 32 may then cooperate to provide a button or link to logon to the desired account without entering his or her password. In embodiments where the mobile device 37 email address, PIN, etc. is registered with the server 31, the server may send a temporary authentication login ID directly to the mobile device 37.

In accordance with another aspect, the following may occur: 1) the mobile device 37 receives (e.g., via NFC or via optical sensor) an identifier (e.g., an IP address) associated with the computer terminal 32; 2) the mobile device 37 sends the identifier of the computer terminal 32 to the server 31; 3) the mobile device 37 instructs the server 31 to send an item (e.g., an email) associated with an account (e.g. a Gmail account) to the computer terminal 32; 4) the computer terminal 32 receives the item (e.g., the email) associated with the account (e.g., the Gmail account) from the server 31; and 5) the computer terminal 32 displays the item (e.g., the email). In a related example embodiments, in step (1) above, the mobile device 37 may receive the identifier associated with the computer terminal 32 when the mobile device 37 is brought proximate to the computer terminal 32. Another example is that in step (3), the mobile device 37 may instruct the server 31 to provide the computer terminal 32 with temporary access to the account. In another example embodiment, the temporary access to the account may be revoked when the mobile device 37 moves away from the computer terminal 32. Furthermore, steps (2) and (3) may be combined. That is, the mobile device 37 may simultaneously send to the server 31 the identifier of the computer terminal 32 and the account to which the computer terminal 32 can be provided access to. This aspect also provides the advantage of the user not having to enter logon credentials on the computer terminal 32.

Example components that may be used in various embodiments of the above-described mobile wireless communications device are now described with reference to an example mobile wireless communications device 1000 shown in FIG. 4. The device 1000 illustratively includes a housing 1200, a keyboard or keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 4:
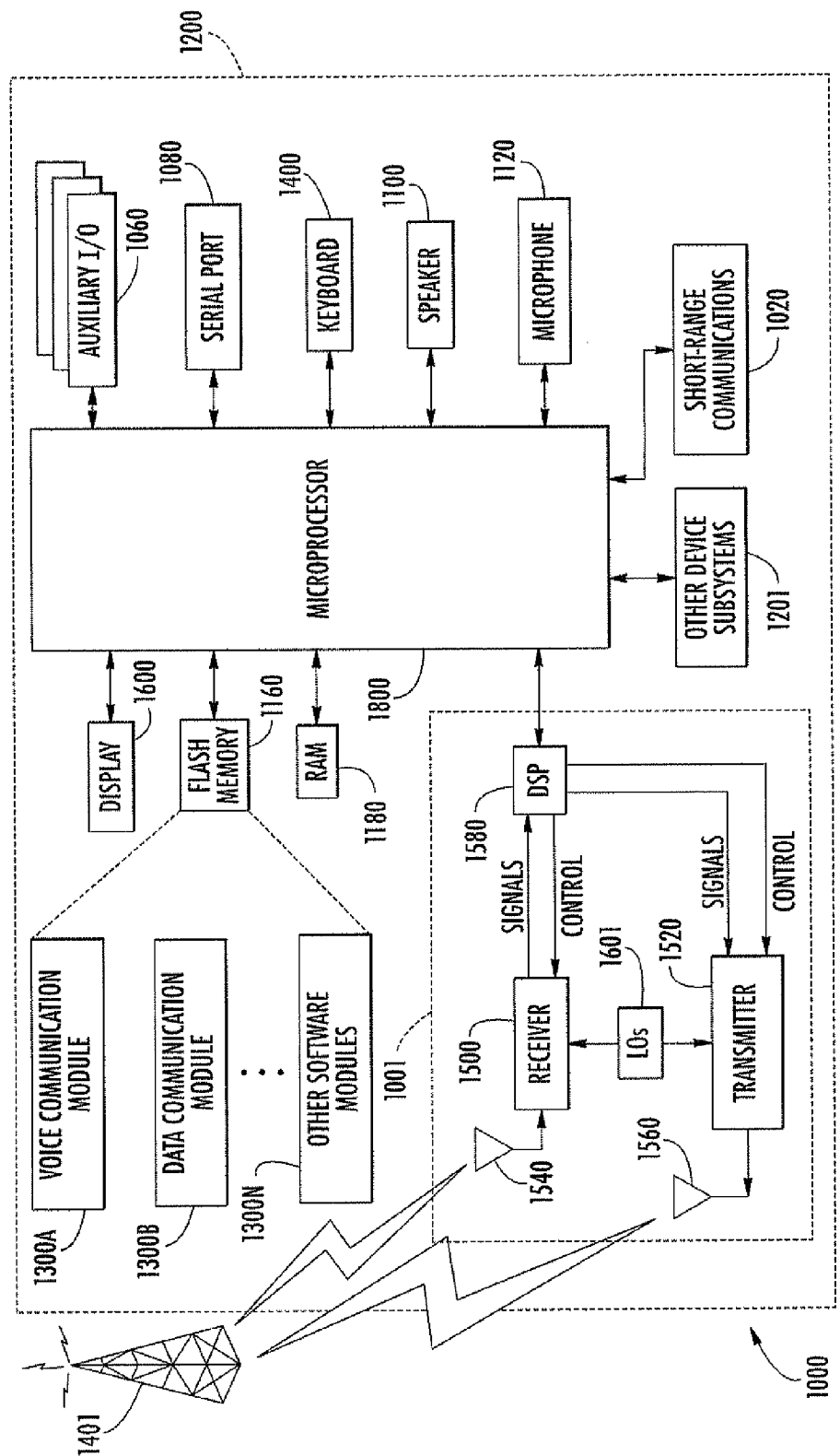
FIG. 4 is a schematic block diagram illustrating additional components that may be included in the mobile wireless communications device of the system of FIG. 1.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201 (e.g., optical sensors (CCD), etc.). The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A communication system comprising:
a server configured to provide data access based upon an authenticated logon;
a computer configured to access said server to receive a temporary authenticated logon identification (ID) for said server, said computer having a computer identifier associated therewith; and
a mobile wireless communications device comprising
a housing,
a wireless transceiver carried by said housing, said wireless transceiver being configured to wirelessly communicate with said server,
a sensor carried by said housing, and
a controller carried by said housing, said controller being coupled to said wireless transceiver and said sensor, said controller being configured to:
cause said sensor to wirelessly retrieve the temporary authenticated logon ID and the computer identifier from said computer terminal, and
cause said wireless transceiver to wirelessly communicate logon and instruction data to said server to cause said server to temporarily provide data access via said computer terminal until said mobile wireless communications device moves away from said computer terminal, the logon data being based upon the temporary authenticated logon ID and the computer identifier.

2. The communication system of claim 1 wherein said sensor comprises a first near field communication (NFC) sensor; wherein said computer comprises a second NFC sensor; and wherein said first NFC sensor and said second NFC sensor are configured to communicate the temporary authenticated logon ID therebetween via NFC communications.

3. The communication system of claim 1 wherein said computer is associated with a display; wherein said computer is further configured to cause said display to display an optical pattern representing the temporary authenticated logon ID; wherein said sensor comprises an optical sensor; and wherein said controller is further configured to cause said optical sensor to read the optical pattern from said display and determine the temporary authenticated logon ID therefrom.

4. The communication system of claim 1 wherein the temporary authentication logon ID comprises a pseudorandom password.

5. The communication system of claim 1 wherein the temporary authentication logon ID comprises an Internet Protocol (IP) address associated with said server.

6. The communication system of claim 1 wherein the logon data comprises at least one of a password and a confirmation to provide data access via said computer.

7. A mobile wireless communications device for use with a server, the server being configured to provide data access based upon an authenticated logon, and a computer, the computer being configured to access the server and to receive a temporary authenticated logon identification (ID) for the server, and the computer having a computer identifier associated therewith, the mobile wireless communications device comprising:

a housing;

a wireless transceiver carried by said housing, said wireless transceiver being configured to wirelessly communicate with said server;

a sensor carried by said housing; and a controller carried by said housing, the controller being coupled to said wireless transceiver and said sensor, the controller being configured to cause said sensor to wirelessly retrieve the temporary authenticated logon ID and the computer identifier from said computer terminal, and cause said wireless transceiver to wirelessly communicate logon and instruction data to said server to cause said server to temporarily provide data access via said computer until said mobile wireless communications device moves away from said computer, the logon data being based upon the temporary authenticated logon ID and the computer identifier.

8. The mobile wireless communications device of claim 7 wherein said sensor comprises a near field communication (NFC) sensor.

9. The mobile wireless communications device of claim 7 wherein said sensor comprises an optical sensor; and wherein said controller is further configured to cause said optical sensor to read an optical pattern from a display associated with the computer and determine the temporary authenticated logon ID therefrom.

10. The mobile wireless communications device of claim 7 wherein the temporary authentication logon ID comprises a pseudorandom password.

11. The mobile wireless communications device of claim 7 wherein the temporary authentication logon ID comprises an Internet Protocol (IP) address associated with the server.

12. A communications method comprising:

accessing a server from a computer over a wide area network to receive a temporary authenticated logon identification (ID) for the server, the server being configured to provide data access based upon an authenticated logon, and the computer having a computer identifier associated therewith;

wirelessly retrieving the temporary authenticated logon ID and the computer identifier from the computer to a mobile wireless communications device; and wirelessly communicating logon and instruction data from the mobile wireless communications device to the server via a wireless communications network to cause the server to temporarily provide data access via the computer until the mobile wireless communications device moves away from the computer, the logon data being based upon the temporary authenticated logon ID and the computer identifier.

13. The method of claim 12 wherein said wirelessly retrieving comprises wirelessly retrieving the temporary authenticated logon ID from the computer to the mobile wireless communications device via near field communication (NFC) communications.

14. The method of claim 12 further comprising causing the computer to display an optical pattern representing the temporary authenticated logon ID on a display; and wherein said wirelessly retrieving comprises the mobile wireless communications device reading the optical pattern from the display and determining the temporary authenticated logon ID from the optical pattern.

15. The method of claim 12 wherein the temporary authentication logon ID comprises a pseudorandom password.

16. The method of claim 12 wherein the temporary authentication logon ID comprises an Internet Protocol (IP) address associated with the server.

17. A non-transitory computer-readable medium for a mobile wireless communications device for use with a server configured to provide data access based upon an authenticated logon and a computer configured to access the server to receive a temporary authenticated logon identification (ID) for the server, the computer having a computer identifier associated therewith, the mobile wireless communications device comprising a housing, a wireless transceiver carried by the housing, and a sensor carried by the housing, and the computer-readable medium having computer executable instructions for causing the mobile wireless communications device to perform steps comprising:

causing the sensor to wirelessly retrieve the temporary authenticated logon ID and the computer identifier from the computer; and causing the wireless transceiver to wirelessly communicate logon and instruction data to the server authenticating logon and to cause the server to temporarily provide data access via the computer until the mobile wireless communications device moves away from the computer, the logon data being based upon the temporary authenticated logon ID and the computer identifier.

18. The computer-readable medium of claim 17 wherein the sensor comprises a first near field communication (NFC) sensor; wherein said computer comprises a second NFC sensor; and wherein the first NFC sensor and the second NFC sensor are configured to communicate the temporary authenticated logon ID therebetween via NFC communications.

19. The computer-readable medium of claim 17 wherein the computer is associated with a display; wherein the computer is further configured to cause the display to display an optical pattern representing the temporary authenticated logon ID; wherein the sensor comprises an optical sensor; and further comprising computer-executable instructions for causing the optical sensor to read the optical pattern from the display and determine the temporary authenticated logon ID therefrom.

20. The computer-readable medium of claim 17 wherein the temporary authentication logon ID comprises a pseudorandom password.

21. The computer-readable medium of claim 17 wherein the temporary authentication logon ID comprises an Internet Protocol (IP) address associated with the server.

* * * * *